(12) United States Patent
Hussa (10) Patent No.: US 6,611,788 B1
(45) Date of Patent: Aug. 26, 2003

(54) APPARATUS AND METHOD FOR MEASURING AND RECORDING MOVEMENT OF A MOBILE STATION USING A MOBILE NETWORK

(75) Inventor: Timo Hussa, Haapavesi (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/573,367

(22) Filed: May 17, 2000

(51) Int. Cl.⁷ .................. G01B 11/02; G01B 11/14; G01B 13/02
(52) U.S. Cl. .................................... 702/160
(58) Field of Search .............. 702/160; 340/323; 370/17

(56) References Cited

U.S. PATENT DOCUMENTS

| | | | | |
|---|---|---|---|---|
| 5,128,925 A | * | 7/1992 | Dornstetter et al. | 370/17 |
| 5,128,935 A | | 7/1992 | Perloff et al. | 370/17 |
| 5,696,481 A | * | 12/1997 | Pejas et al. | 340/323 |
| 6,013,007 A | * | 1/2000 | Root et al. | 482/8 |

FOREIGN PATENT DOCUMENTS

| | | | | | |
|---|---|---|---|---|---|
| DK | 3008643 A | * | 9/1980 | | A63B/71/06 |
| DK | 04437538 A | * | 5/1995 | | G08C/17/02 |
| EP | 0 930 513 | | 12/1998 | | G01S/5/10 |
| WO | WO 92/05672 | | 4/1992 | | H04Q/7/04 |
| WO | WO 97/27711 | | 7/1997 | | H04Q/7/20 |
| WO | WO 98/19479 | | 5/1998 | | H04Q/7/22 |

* cited by examiner

Primary Examiner—John Barlow
Assistant Examiner—Aditya Bhat
(74) Attorney, Agent, or Firm—Cohen, Pontani, Lieberman & Pavane (57) ABSTRACT

An apparatus and method for measuring movement of a Mobile Station held by a user and for measuring the elapsed time of such movement. The invention is particularly suited for following the movements of the athlete as the athlete trains and/or competes, timing the athlete's movements and recording the time elapsed and the distance traveled by the athlete.

47 Claims, 4 Drawing Sheets

APPARATUS AND METHOD FOR MEASURING AND RECORDING MOVEMENT OF A MOBILE STATION USING A MOBILE NETWORK

BACKGROUND OF THE INVENTION

1. Field of the Invention

The present invention relates to a mobile communication system having a service for following and recording athletic training achievements by recording a distance traveled and an elapsed time of travel of a mobile station held by or held on the athlete.

2. Description of the Related Art

Traditional methods for measuring distances covered by athletes and elapsed times of travel during training include using pedometers or odometers and stop watches or other timers. These two separate instruments require that the results be manually entered into a database for recordation and analysis.

Cellular communications systems serve service areas which are divided into cells (geographic areas). Each cell is served by a base station having an antenna and radio equipment for connecting the mobile station within a geographical area of the associated cell to a central office. As a mobile station in active conversation moves from one cell to another, the system performs a hand-off routine in which the mobile station is switched to a new communication channel with a new base station in the cell that the mobile station is entering.

To provide more efficient hand-offs and traffic management, the approximate location of the mobile station engaged in an active call needs to be known. Furthermore, cellular communication systems may also provide mobile station location service which provide the approximate location of a mobile station even if the mobile station is not engaged in an active call.

SUMMARY OF THE INVENTION

The object of the present invention is to provide a service in a mobile communication system for following and recording the time and distance traveled by a mobile station held by an athlete during training, so that the results of the training exercise are automatically recorded in a database.

The service provided by the present invention is implemented in a cellular communication network including a Core Network (CN) and a plurality of Radio Network Controllers (RNCs) with each RNC controlling at least one Base Station (BS). The CN according to the invention contains a timer, a location system, and a database. The location system may comprise any system used to locate Mobile Stations (MSs) that is accurate enough to measure distance traveled by the user. Several methods are known for locating the MS including the Time Of Arrival (TOA) method, the Enhanced Observed Time Difference (EOTD) method, the Global Positioning System (GPS) method, and the Cell Identification and Timing Advance (TA) method.

The cell ID and the TA methods use functions which are already performed by the network. The network knows the serving cell location and the timing advance value when a call is in progress. However, the serving cell ID method limits the possible location of the mobile station to within the cell coverage area, the radius of which may be 35 kilometers long. Therefore, the accuracy may not be sufficient for the purposes of the present invention. Furthermore, the TA value is only an estimate of the distance between the serving base station and the MS. Therefore, the resolution of the TA method may also be insufficient for purposes of the present invention. The cell ID method is disclosed for example in PCT Patent Application No. WO 98/19479 and the TA method is disclosed in PCT Patent Application No. WO 97/27711.

The TOA method involves a handover of the MS (including an intracell handover) during which the MS transmits access bursts. The access bursts are received at location measurement units (LMUs) which may be separate devices or integrated with the Base Transceiver Stations (BTSs). Each LMU determines the time of arrival of the access burst and transmits the determined Time Of Arrival to a Serving Mobile Location Center (SMLC) which may be integrated in a Base Station Controller (BSC). The difference between the TOAs and the locations of the LMUs are used to calculate the location of the MS. The disadvantages of this method are that (1) the LMUs must know which channel to measure which requires coordination in the network and generates extra signaling load and (2) The TOA requires that the LMUs have a common clock.

In the E-OTD method, the MS receives signals from BTSs and determines the time differences between receptions, i.e. the Observed Time Difference. Since the MS performs the measurement, the BTSs do not have to be synchronized. The E-OTD method requires that either the BTSs transmit simultaneously or that the timing differences between them are known. Examples of the OTD method are disclosed in U.S. Pat. No. 5,128,925, EP 0 930 513 and WO 92/05672, each of these using Real Time Difference (RTD) between the BTSs to determine the location of the MS.

The GPS method is a satellite based location system and requires that a GPS receiver be integrated into the handset. However, the conventional GPS requires line-of-sight to at least three satellites which may cause problems indoors and in urban areas. The accuracy of the GPS system can be within 5 meters. The disadvantages of GPS are a higher handset cost, increased power consumption, and ergonomic problems for integrating a GPS antenna into a handset.

The location service according to the present invention may be based on any mobile telephone service such as, for example, a Global System for Mobile Communication (GSM) based service or Universal Mobile Telephone System (UMTS). Instead of mobile telephones, any handheld wireless device may be used in a Wireless Application Protocol (WAP) based service such as, for example, a personal digital assistant (PDA) or a beeper.

According to an embodiment of the invention, the user first sets parameters using the MS and sets the service into an "active" state. When predetermined start measurement criteria are entered on the MS or are otherwise fulfilled, the service begins measurement of the distance traveled and the elapsed time. The results are collected and sent to the database in the CN and to the MS. The measurement and collection of distance and time data continue until predetermined stop measurement criteria are entered on the MS or otherwise fulfilled. At that point, measurements are stopped and the service saves the results in the CN and sends the results, for example, to the MS.

The user first uses the MS to select the athletic training achievement recording service from the list of services available to the user. The parameters which may be set include a database destination so that the user can select where to send the results of the measurement. The choices may comprise a service provider database, MS database, another MS, or an e-mail address. The user may also set how the measurements are to be started or stopped. The service may be manually started and stopped or automatically started and stopped. The automatic start/stop may be place-dependent, time-dependent, or traveled-distance-dependent. The user may also choose the type of display on the MS such as, for example, real-time display, periodic display, or place-dependent display.

The service may be used by athletic coaches to monitor the performance of his athletes during training. Instead of running or jogging, other sports such as bicycling, skiing, skating, and sailing may also be monitored. The service provider may host different competitions in which users collect achievements for a period of time such as, for example, a month and provide prizes for the further distance traversed, most improved on a specific course, etc.

This service may additionally be used to monitor the movements of cars and trucks as a tachograph. This may be useful for the owner of a fleet of trucks or cars for automatically tracking the distance traveled for each truck or car and for determining where the trucks or cars are located at any point or points in time.

The various features of novelty which characterize the invention are pointed out with particularity, in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
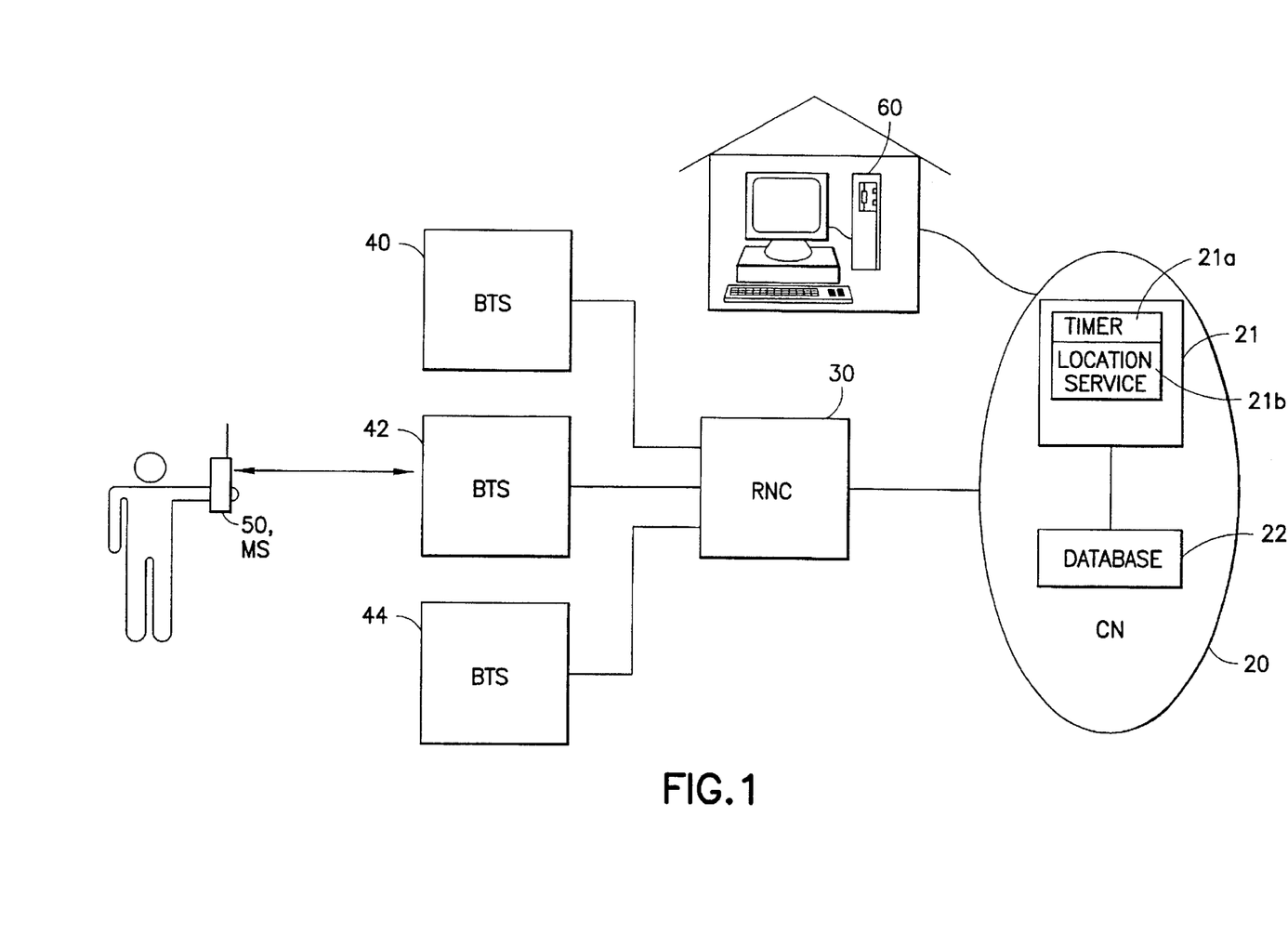
FIG. 1 is a block diagram showing the communication system including a service for recording travel distance and elapsed time of a mobile station.

Referring to FIG. 1, a service for recording a travel distance and elapsed time of travel of a wireless terminal, i.e. Mobile Station (MS) 50, is provided by a service network such as a Core Network (CN) 20 comprising service equipment 21 including a timer 21*a* and a location service 21*b* for locating a position of the MS 50. The CN 20 is part of a communication system having a wireless network. In a preferred embodiment, the wireless network comprises a plurality of Radio Network Controllers (RNCs) 30, i.e., Base-Station Controllers, wherein each RNC 30 controls a plurality of Base Transceiver Stations (BTSs) 40, 42, 44. Each of the BTSs 40, 42, 44 contain antennas and radio equipment for providing a wireless communication link to an MS 50 within a geographic area—cell—served by the BTSs 40, 42, 44.

The service according to the invention records the training records of an athlete-user, such as a jogger. The location service 21*b* follows the location of the jogger as the jogger moves and records the distance covered and the elapsed time of the run. The results may then be saved to a database 22 connected with the service equipment 21 or sent (i.e., by e-mail) to a database of the user, such as a database in the MS 50 or a database in a home computer 60 of the user. The types of location service 21*b* which may be used Time Of Arrival (TOA) method, the Enhanced Observed Time Difference (E-OTD) method, the Global Positioning System (GPS) method, the Cell Identification and Timing Advance (TA) methods, or any other type of location service method suitable for this purpose.

The cell, ID and the TA methods use functions which are already performed by the network. The network knows the serving cell location and the timing advance value when a call is in progress. However, the serving cell ID limits the possible location of the MS 50 to within the cell coverage area, the radius of which may be 35 kilometers long. The TA value is an estimate of the distance between the serving BTS 40, 42, 44 and the MS 50. The cell ID method is disclosed for example in PCT Patent Application No. WO 98/19479 and the TA method is disclosed in PCT Patent Application No. WO 97/27711.

The TOA method involves a handover of the MS 50 (including an intracell handover) during which the MS 50 transmits access bursts. The access bursts are received at location measurement units (LMUs) which may be separate devices or integrated with the BTSs 40, 42, 44. Each LMU determines the time of arrival of the access burst and transmits the determined Time Of Arrival to a Serving Mobile Location Center (SMLC) which may be integrated in the RNC 30. The difference between the TOAs and the locations of the LMUs are used to calculate the location of the MS 50.

In the E-OTD method, the MS 50 receives signals from BTSs 40, 42, 44 and determines the time differences between receptions, i.e. the Observed Time Difference. Since the MS 50 performs the measurement, the BTSs 40, 42, 44 do not have to be synchronized. The E-OTD method requires that either the BTSs 40, 42, 44 transmit simultaneously or that the timing differences between them are known. Examples of the E-OTD method are disclosed in U.S. Pat. No. 5,128,925, EP 0 930 513 and WO 92/05672. Each of these references disclose using Real Time Difference (RTD) between the BTSs to determine the location of the MS.

The GPS method is a satellite based location system and requires that a GPS receiver be integrated into the handset. However, the conventional GPS requires line-of-sight to at least three satellites which may cause problems indoors and in urban areas. The accuracy of the GPS system can be within 5 meters. However, the disadvantages of GPS are a higher handset cost, increased power consumption, and ergonomic problems integrating a GPS antenna into a handset.

To calculate the distance traveled, the service 21 determines the location at which the user starts, i.e., the starting point. After a predetermined time interval, which could vary depending on the sport being monitored, the location service 21*b* determines the current location. The difference between the start location and the current location is calculated and is added to a distance traveled register. The process is then repeated using the last current location as the start position. After each periodic time interval, the distance traveled is added to the distance traveled register. At the completion of the measurement, i.e. when the stop criteria are met, the distance traveled register value is the distance traveled.

Figure 2:
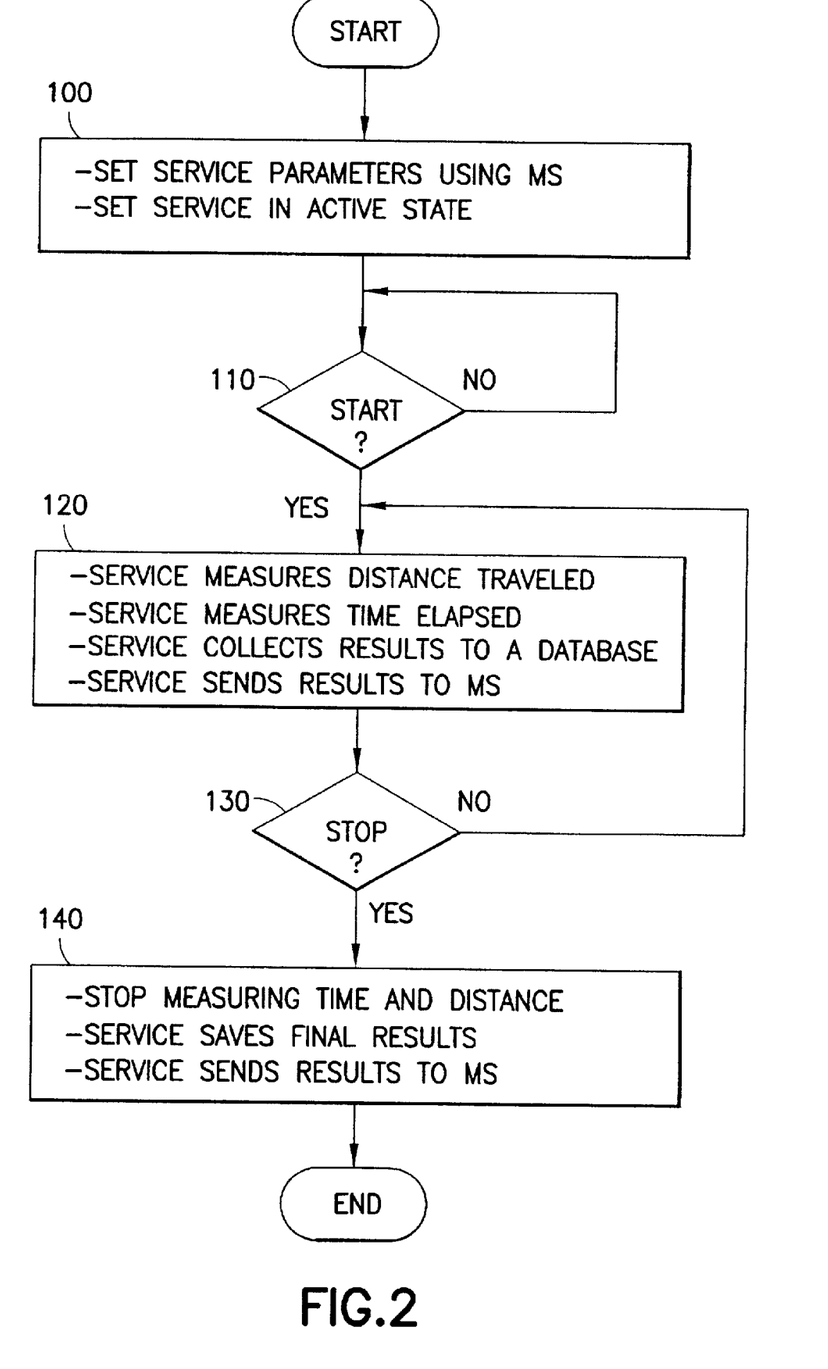
FIG. 2 is a flow diagram showing the steps for recording the travel distance and elapsed time of a mobile station.

Referring to FIG. 2, a user 52 must first connect to the service and activate the service using the MS 50, step 100.

The connection of the MS 50 to the service in the network may be made by the user choosing the service from a menu on the MS 50. After the selection by the user, the MS 50 transmits a signal to the CN 20 including a description of the MS 50. The CN 20 then connects the MS 50 with the service equipment 21 which may be in the serving network or some other network. The service equipment 21 uses an appropriate service such as the Short Message Service (SMS) to communicate with the MS 50.

Alternatively, a user may use a PC or other computer such as computer 60 in FIG. 1 to activate the service equipment 21. The computer may be connected to the network via a wired or wireless connection. In this case, the computer 60 must include information regarding the MS 50 to be followed in its memory so that the service equipment 21 knows which MS 50 to follow. The MS 50 acts as a passive component in this case.

For all embodiments, the MS 50 may comprise any handheld wireless device such as, for example, a mobile phone or any Wireless Application Protocol (WAP) based device. If, for example, the MS 50 is a mobile phone, the user will have at least two services available, the first service being the phone service and the second service being the athlete achievement service of the present invention. The step of connecting the MS 50 to the service may comprise selecting the service from a menu.

The MS 50 may alternatively comprise a device specifically designed for the inventive jogging achievement service such as a watchband. In this embodiment, connecting to the service may comprise actuating a "connect" button on the specifically designed device. Step 100 may further comprise a substep allowing the user 52 to first set the service parameters. The parameters to be set include defining start criteria. The user 52 may define the start criteria as being a manual start or an automatic start. However, step 110 indicates that the service waits indefinitely until start criteria are met. The service parameters, such as the start criteria, may be assigned default values so that the user does not have to set them each time he enters the service.

After the start criteria are met, the service equipment 21 performs step 120 in which the location service 21b measures the distance traveled and the timer 21a measures the elapsed time. The service also collects the results and saves the results in a database 22 of the service in the CN 20. The service also transmits the results to a database and/or the MS 50 so that the user has access to the results during the measurement.

The measuring of the distance and time is terminated when user defined stop criteria are met, step 130. The stop criteria may require that the user manually stop the measuring using the MS 50. Alternatively, the stop criteria may also be automatically activated such as after a predetermined period of time has elapsed, after a predetermined distance has been covered, or when the mobile station reaches a certain point or location.

When the stop criteria are met, the service equipment 21 stops measuring the distance and time and saves the results in the database 22, step 140. The results are also sent to the MS 50 so that the user has immediate access to the results.

In addition, while the distance and time are being measured, the results may be sent to an additional MS such as one held by a coach or to a terminal so that another person can view the results of the athlete's training exercise. Furthermore, the results may optionally be sent to all selected target devices simultaneously.

Figure 3:
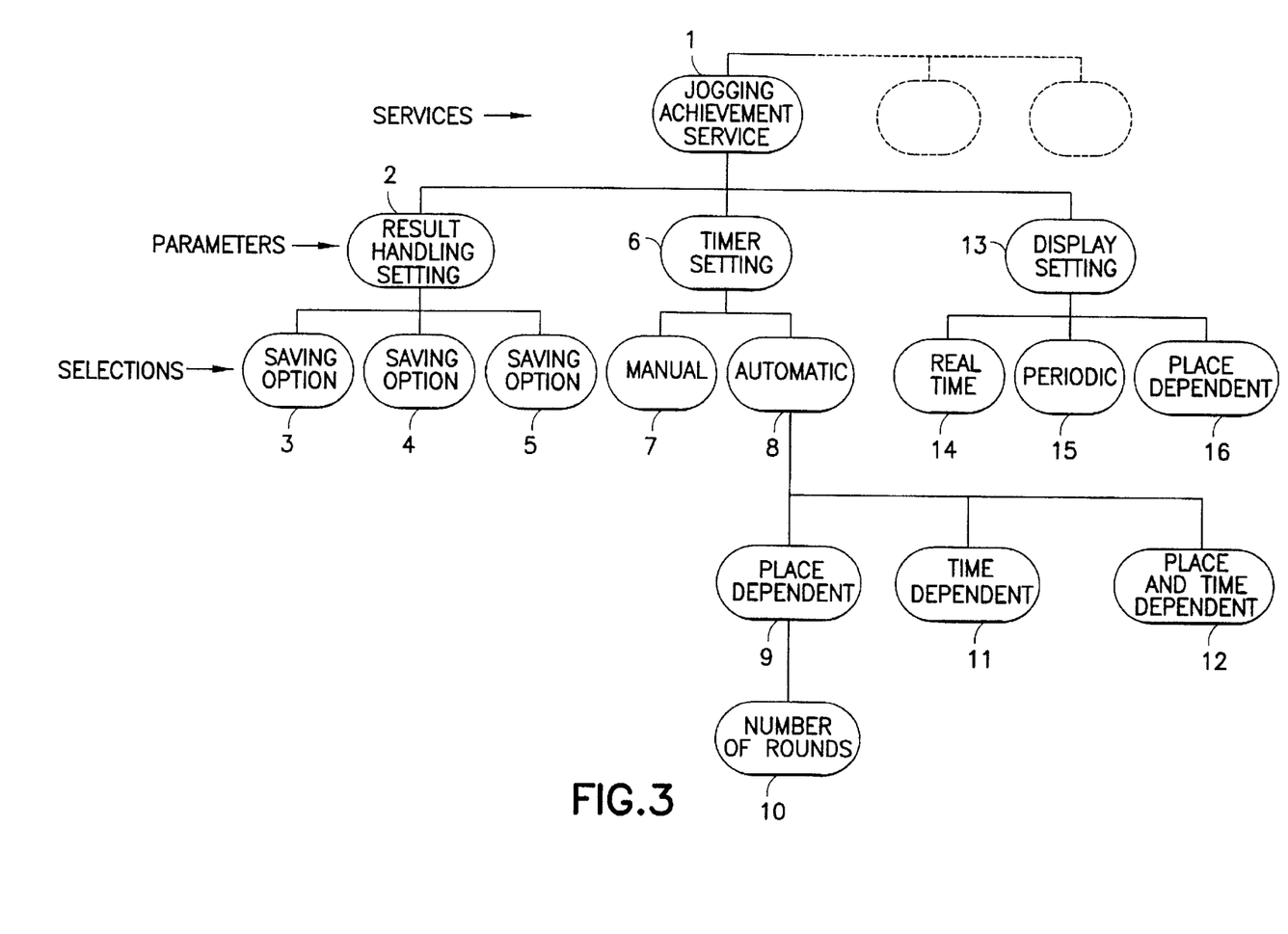
FIG. 3 is a diagrammatic representation of the different options available for the inventive service.

FIG. 3 is a diagram showing an example of the various selections available to the user during the parameter setting phase of step 100. FIG. 3 is merely a diagrammatic depiction of the hierarchy of the difference selections and does not indicate that there is a button for each of the various selections. Rather, the selections described may be menu driven. The various selections available may be indicated on a screen display on the MS or as audio messages on the MS. Furthermore, the inventive service may be controlled from a PC via a wired or wireless internet. In this optional embodiment, the MS 50 may be a passive component which is merely monitored while the results are sent to the PC. Furthermore, targets may also be selected for sending the results to such as, for example, the runner's MS and/or a coach's MS.

At selection 1, the user selects the jogging achievement service on his MS from a list or menu of all services available to him. Instead of directly going to the jogging service, the inventive service may be an athletic achievement which allows the user to choose which one of a list of sports will be performed such, for example, as skating, skiing, and bicycling.

After selecting the jogging achievement service, the display of the MS will list the different options available to the user including result handling settings 2, timer settings 6, and display settings 13. The user may then select one of these to select the appropriate settings.

If result settings 2 is selected, the user may select where the results are to be stored. The user may then select savings options 3, 4, or 5. If the user selects option 3, the results are stored in the service operator's data base 22 located in the CN 20. If the user selects option 4, the results are stored at a user defined database which may be in the MS 50 or in a personal computer 60 in the user's home. If option 5 is selected, the user may select to direct the results to another MS. The other MS may be a coach's MS or a team mate's MS, for example, who can monitor how the exercise is progressing.

If the timer settings 6 is selected, the user may define how the service will start and stop the measurements. The user may select manual start/stop (selection 7) or automatic start/stop (selection 8). The simplest way to manually start/stop the measurement is by pushing predetermined start and stop buttons on the MS. The start/stop control may also be speech activated.

The automatic start/stop of the measurement may depend on several different criteria. When the service is activated, the measurement starts and stops the measurement when the predetermined start and stop criteria are met.

The user may select a place dependent start/stop criteria 9 which starts the measurement when the user (with the MS) is at a predetermined starting location and stops the measurement when the user is at a predetermined stopping location. If a user is running around a track, the user may set the number of rounds the user would like to make around the track at selection 10 so that the service stops measuring when the amount of predetermined rounds is achieved.

The place dependent start/stop criteria is also useful for tracking orienteering contests in which participants navigate between predetermined control points or check points using a map and a compass. The service according to the invention may measure the duration and travel distance of each leg or stage of the orienteering course. In addition, the place dependent start/stop criteria may also be used for informing an audience of the progress of contestants running on, for example, a cross-country course which travels through the woods and is not directly viewable by the audience.

Furthermore, the user may select a time dependent start/stop criteria 11 which is useful if a user wishes to determine a distance traveled during a specific time span such as, for example, 12 minutes of running.

The user may also select a place dependent start/stop criteria 12. The start/stop criteria could also be a mix of the manual and automatic start/stop criteria. For example, the user could set the service to measure the distance and time for 12 minutes following a manual start. In this case, the service starts measuring in response to a manual pressing of a button or a voiced command to start and stop automatically 12 minutes after the manual start.

If the display setting 13 is selected, the user may define how results will be viewed on the MS display. A real time display 14 may be selected in which the results are updated in real time and continuously displayed on the MS.

A periodic display 15 may also be selected in which the results are displayed periodically, such as every 2 minutes. In addition, the user may define that the results are displayed after the exercise is finished.

A place dependent display 16 displays the results on the MS when the user reaches predefined places. This particular type of display setting may be useful in the orienteering example described above.

After the selections are made, they are transmitted from the MS 50 to the service equipment 21. The selection may be saved and used as default values for the next use. Furthermore, as is conventional on mobile phones, a user may navigate between different menu levels (i.e., the services, parameters, and selection levels shown in FIG. 3) by actuating buttons on the mobile phone during the above described parameters selection process.

Figure 4:
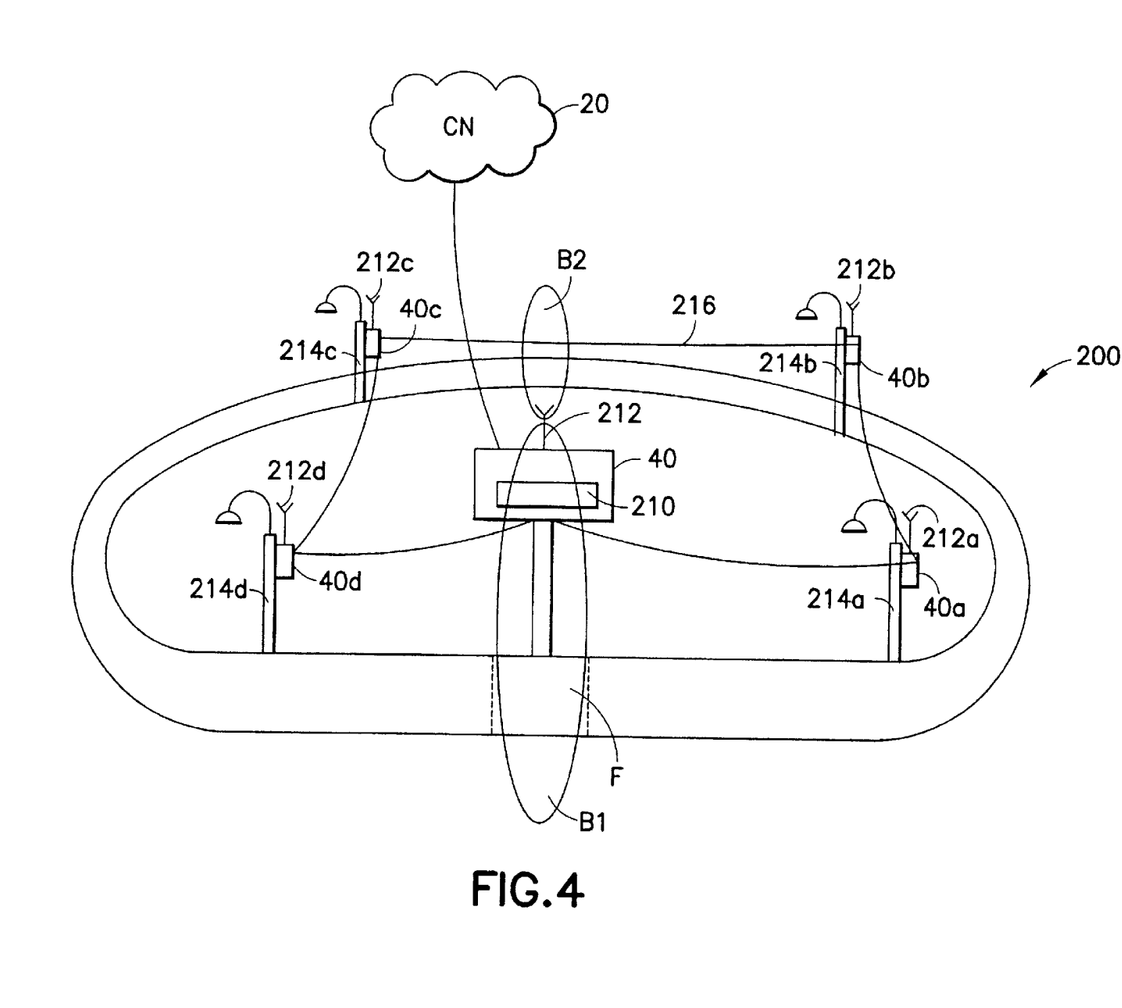
FIG. 4 is a schematic diagram showing an implementation of a communication system of the invention at a track.

An embodiment of the present invention is shown in FIG. 4 in which the inventive service is arranged for use at a track 200. An antenna 212 is arranged at a final area F of the track 200. The antenna 212 is arranged so that it transmits a signal to the MS when the MS reaches the final area F. The MS responds by sending its identification code. The BTS 40 to which the antenna 212 is connected then registers the user's lap time to a database. As stated above the database may be part of the core network or remotely located user database.

In general, BTSs typically comprise several transceivers and antennas. Therefore, the antenna 212 shown in FIG. 4 may be part of a larger BTS that contains more than one antenna. The antenna 212 and its associated transceiver in FIG. 4 may be dedicated to the jogging service and other antennae and transceivers of the BTS operate normal tasks. Of course, the entire BTS 40 may also be dedicated to the jogging service. Alternatively, the BTS 40 of FIG. 4 may be an isolated BTS which is not connected to a CN 20. A database may be connected to the BTS 40 for recording the lap times for each MS on the track.

Because the traveled distance for each lap is constant, the embodiment of FIG. 4 does not require the same type of location service 21b as described above. Instead, the location service 21b operatively connected with the BTS 40 of FIG. 4 may comprise a counter for counting the number of laps around the track 200. The start and stop times for each lap begin and end when the MS appears in the narrow antenna beam B1 at the final area F of the track. A further antenna beam B2 may optionally be directed at a far end of the track for measuring intermediate times. The antenna beam B1 may also be steerable so that the antenna beam B1 may be directed to the individual MS on the track.

Furthermore, instead of or in addition to a display on the MS, the embodiment of FIG. 4 may comprise a display 210 arranged on the BTS 40 located beside the track 200. In this embodiment, a user can check his times after each lap is completed.

In a very specific embodiment, a plurality of BTSs 40a–40d and/or antennas 212a–212d may be arranged on lampposts 214a–214d surrounding the track. Each BTS 40a–40d or antenna 212a–212d detects when the runner or jogger passes the lamppost it is situated on and therefore, measures intermediate times for each lap. Power cables 216 for the lampposts may be used to transfer the data to a central location such as the base transceiver station 40.

In the embodiment of FIG. 4, the MS may comprise a cell phone or a wristband device. When the cell phone is used, the same selection of parameters as described above may be effected when the phone is in the final area F of the track 200 and therefore able to communicate with the BTS 40. Therefore, the user can define the start time, stop time, i.e., by defining the number of laps to be completed. The MS may also comprise a very simple wristband device with one button for starting an stopping measurement. Of course the wristband may comprise a more elaborate device with a plurality of buttons for performing the same functions as the cell phone with respect to the present invention. For both of these embodiments, the BTS 40 may comprise a user interface for looking up results and for system update by a system administrator.

The service for recording jogging achievements may also be used to record skating, skiing, bicycling, sailing and any other activity in which location, time, and/or distance may be required as a statistic. Furthermore, a vehicle with a MS may also be tracked. For example, a fleet operator may want to keep records of how far each vehicle in the fleet has gone without manually checking each tachometer.

Furthermore, the service provider may host different fitness training competitions wherein users can collect achievements and, for example, the contestant who travels the farthest in one month wins.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A service in a communication network for measuring at least one of time and distance for tracking and recording movements of a wireless terminal, the communication network having a service network and a wireless terminal in communication with the service network, said service comprising:

a location system operatively connected to the service network for determining a location of the wireless terminal;

distance calculating means connected with said service network for calculating a distance traveled by the wireless terminal between a plurality of determined locations of the wireless terminal from a start time to a stop time, said distance calculating means being responsive to commands communicated from said wireless terminal to said distance calculating means of said service network;

a timer operatively connected to the service network for measuring an elapsed time between the start time and the stop time; and a database operatively connected to said location system and said timer for recording data corresponding to the elapsed time measured by said timer and the distance traveled by the wireless terminal as calculated by said distance calculating means.

2. The service of claim 1, further comprising identity input means for inputting an identity of a user moving the wireless terminal, the identity input means being operatively connected to the database so that the recorded data in said database is associated with the user.

3. The service of claim 1, further comprising means for selecting one of a manually activated start and stop times and automatically activated start and stop times.

4. The service of claim 3, wherein said start and stop times are place dependent.

5. The service of claim 4, wherein said stop time is dependent on a number of laps the wireless terminal travels around a track.

6. The service of claim 3, wherein said stop time is traveled distance dependent.

7. The service of claim 1, wherein said service network comprises said database.

8. The service of claim 1, wherein said database is located at a remote location and is connectable to the service network via an internet connection.

9. The service of claim 1, wherein said database is located in the wireless terminal or in another wireless terminal.

10. The service of claim 1, further comprising means for transmitting real time display information to said wireless terminal from said service network between the start time and the stop time.

11. The service of claim 1, further comprising means for transmitting periodic display information to the wireless terminal from said service network between the start time and the stop time.

12. The service of claim 1, further comprising means for transmitting place dependent display information to the wireless terminal from said service network between the start time and the stop time.

13. The service of claim 1, wherein said location system comprises a counter for counting a number of laps the wireless terminal has traveled around a track.

14. The service of claim 13, further comprising a display arranged remote from the wireless terminal for displaying at least the results of the last lap completed by the wireless terminal.

15. The service of claim 13, further comprising means for transmitting, from the location system, the current value of the number of laps traveled to the wireless terminal.

16. The service of claim 1, wherein said communication network further comprises a wireless network connected to said service network for facilitating communication between the wireless terminal and said service network, said wireless network comprises a pair of base transceiver stations and said location system comprises one of a time of arrival positioning mechanism which measures the time of arrival of a signal transmitted from the wireless terminal to at least three measuring units, an observed time difference positioning mechanism which measures a time difference between arrival of a signal frog the pair of base transmission stations, and a global positioning assisted positioning mechanism.

17. A method for monitoring at least one of a distance and time traveled by a wireless terminal of a user using a communication system having a service network and a wireless terminal for communicating with the service network, said method comprising the steps of:

(a) determining, by service equipment in the service network, whether a start criteria are met after the service equipment is activated in response to an activation signal initiated by the wireless terminal;

(b) measuring a distance traveled and a time elapsed by the user by monitoring movement of the wireless terminal held by the user with a location system connected in the service network when it is determined in said step (a) that the start criteria are met;

(c) determining, by the service equipment, whether a stop criteria are met;

(d) stopping measurement of the distance traveled and the time elapsed when it is determined in said step (c) that the stop criteria are met; and (e) recording the measured distance traveled and the measured time elapsed at the time that the stop criteria are met.

18. The method of claim 17, wherein in said step (a) the start criteria are met when a start button is manually depressed, and in said step (c) the stop criteria are met when a stop button is manually depressed.

19. The method of claim 17, wherein in said step (a) the start criteria are met when the wireless terminal held by the user reaches a predetermined start location and in said step (c) the stop criteria are met when the wireless terminal reaches a predetermined stop location.

20. The method of claim 17, wherein in said step (c) the stop criteria are met when the wireless terminal has completed a predetermined number of laps around a track.

21. The method of claim 17, wherein in said step (a) the start criteria are met when a predetermined start time is reached and in said step (c) the stop criteria are met when a predetermined stop time is reached.

22. The method of claim 17, wherein in said step (c) the stop criteria are met when the wireless terminal has traveled a predetermined distance.

23. The method of claim 17, wherein step (b) further comprises the step of transmitting the distance traveled and the elapsed time from the location system to the wireless terminal and displaying the distance traveled and the elapsed time on said wireless terminal.

24. The method of claim 23, wherein said step of displaying comprises continuously displaying the distance traveled and the time elapsed.

25. The method of claim 23, wherein said step of displaying comprises periodically displaying the distance traveled and the elapsed time at periodic intervals.

26. The method of claim 23, wherein said step of displaying comprises displaying the distance traveled and the elapsed time when the wireless terminal has reached predetermined locations.

27. The method of claim 17, wherein said step (e) comprises recording the measured distance traveled and the measured time elapsed in a database in the service network.

28. The method of claim 17, wherein said step (e) comprises recording the measured distance traveled and the measured time elapsed in a database in the wireless terminal.

29. The method of claim 17, wherein said step (e) comprises recording the measured distance traveled and the measured time elapsed in a database at a remote location and connectable to the core network via an internet connection.

30. The method of claim 17, wherein said user comprises an athlete so that said step (e) further comprises associating the measured distance and measured time with the athlete.

31. The method of claim 17, wherein the wireless terminal is associated with a vehicle so that said step (e) further comprises associating the measured distance and measured time with the vehicle.

32. A service for measuring at least one of a distance and time for tracking and recording movements of a wireless terminal around a continuous track, comprising:
- a base transceiver station comprising an antenna arranged at a final area of the continuous track for detecting when the wireless terminal enters the final area of the continuous track;
- a timer operatively connected with said base transceiver station for measuring an elapsed time between a start time and a stop time;
- a counter operatively connected to said base transceiver station for counting the number of laps traveled by the wireless terminal and a distance calculating means for calculating a distance traveled by the wireless terminal based on the number of laps traveled; and
- a database operatively connected to said base transceiver station for recording data corresponding to the elapsed time measured by said timer and distance traveled as calculated by said distance calculating means, wherein said timer and said counter are activated in response to commands received from the wireless terminal, the command being communicated to said timer and counter via said base transceiver station.

33. The service of claim 32, wherein said antenna comprises means for focusing a first narrow antenna beam at the final area of the track.

34. The service of claim 33, where said antenna further comprises means for focusing a second narrow antenna beam at another area of the track for measuring an intermediate time.

35. The service of claim 32, wherein said base transceiver station is dedicated to said track.

36. The service of claim 35, wherein said base transceiver station further comprises a user interface.

37. The service of claim 32, wherein said base transceiver station is in communication with a service network of a communication system.

38. The service of claim 37, wherein said base transceiver station further comprises a user interface.

39. The service of claim 32, further comprising a plurality of base transceiver stations arranged at lamp posts around the track.

40. The service of claim 39, wherein said plural base transceiver stations comprise means for transmitting signals over electric power cables connecting the lamp posts.

41. The service of claim 32, further comprising a wireless terminal dedicated to the service having means for communicating with said base transceiver station.

42. The service of claim 41, wherein said wireless terminal comprises a wristband.

43. A wireless terminal for use with a service for measuring at least one of a time and distance for tracking and recording movements of the user equipment between a start time and distance for tracking and recording movements of the user equipment between a start time and a stop time, the service being arranged in a communication network having a service network, said wireless terminal comprising means for setting parameters for said measuring of said at least one of time and distance, said parameter including start measurement criteria, stop measurement criteria, display characteristics, and target equipment to which the measurement results may be transmitted and said wireless terminal further comprising means for activating the service by transmitting an activation signal to the service network.

44. The wireless terminal of claim 43, wherein said wireless terminal comprises a wireless phone.

45. The wireless terminal of claim 43, wherein said wireless terminal comprises a wireless application protocol device.

46. The service of claim 32, wherein said base transceiver comprises means for transmitting display information to the wireless terminal during the measuring period between the start time and the stop time.

47. The wireless terminal of claim 43, further comprising means for receiving display formation including the at least one of time and distance measured by said service and means for displaying the display information during the measuring period between the start time and the stop time.

* * * * *